United States Patent [19]
Kaplow et al.

[11] 4,242,580
[45] Dec. 30, 1980

[54] SOLAR-RADIATION COLLECTION APPARATUS

[75] Inventors: Roy Kaplow, Newton; Robert I. Frank, Lexington, both of Mass.

[73] Assignee: Massachusetts Institute of Technology, Cambridge, Mass.

[21] Appl. No.: 47,077

[22] Filed: Jun. 11, 1979

[51] Int. Cl.$^3$ .................................................. G01J 1/20
[52] U.S. Cl. ................................ 250/203 R; 136/246; 126/425
[58] Field of Search ................... 136/89 PC; 126/270, 126/271; 250/203 R; 356/152, 141

[56] References Cited
U.S. PATENT DOCUMENTS
4,086,485   4/1978   Kaplow et al. .................. 250/203 R Primary Examiner—David C. Nelms
Assistant Examiner—Darwin R. Hostetter
Attorney, Agent, or Firm—Hopgood, Calimafde, Kalil, Blaustein & Lieberman

[57] ABSTRACT

The invention contemplates improved apparatus for use in a self-tracking optical system for directing highly concentrated solar radiation upon utilization means such as a photovoltaic cell, wherein the full image of the sun covers the exposure surface substantially only when the axis of the optical system is aligned with the sun. Certain structural features associated with the optical system in the vicinity of cell support effectively enlarge the margin of off-axis misalignment within which self-tracking is achievable. At the same time, certain aspects of these features inherently prevent thermal losses which would otherwise be attributable to convection currents of air in the region of heat concentration.

25 Claims, 8 Drawing Figures

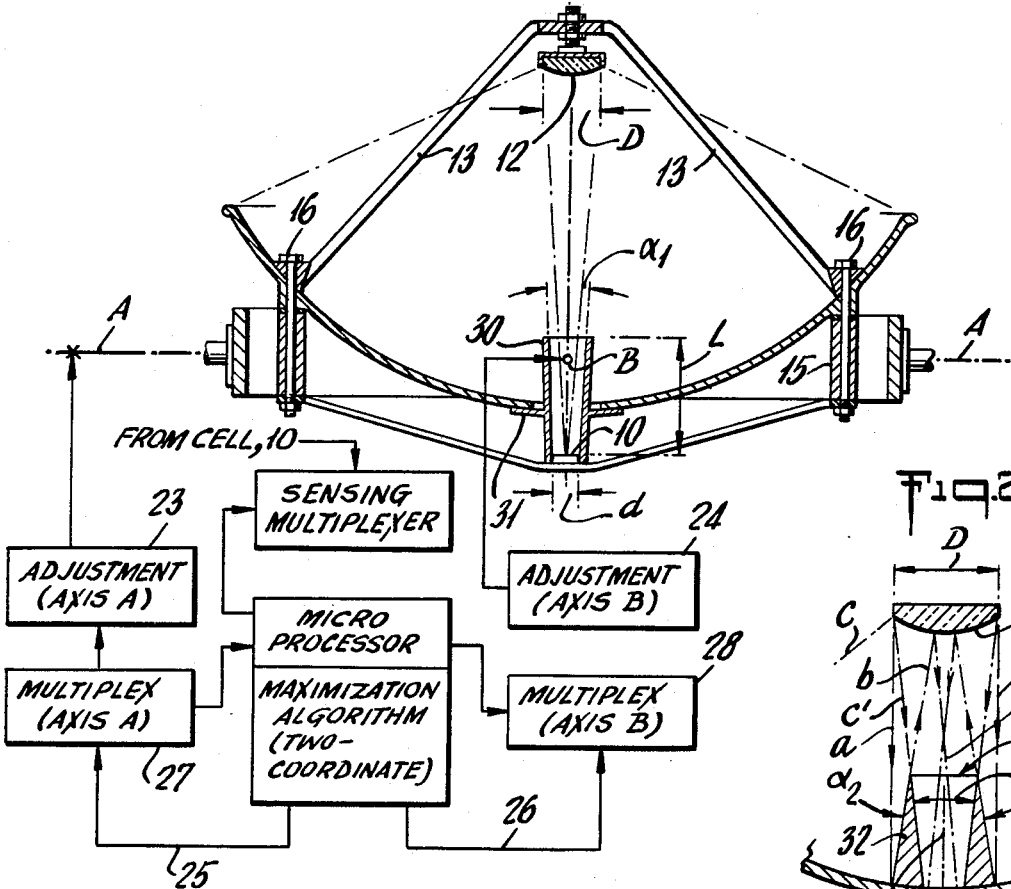

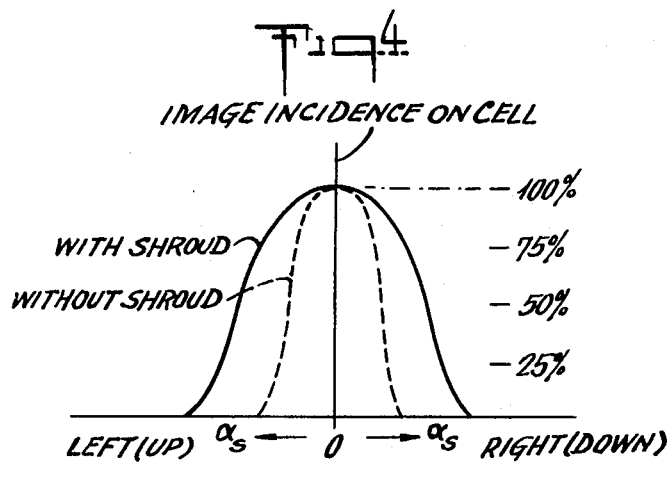
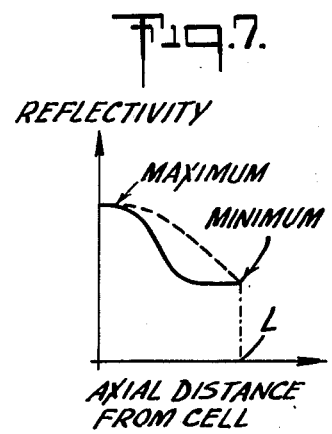
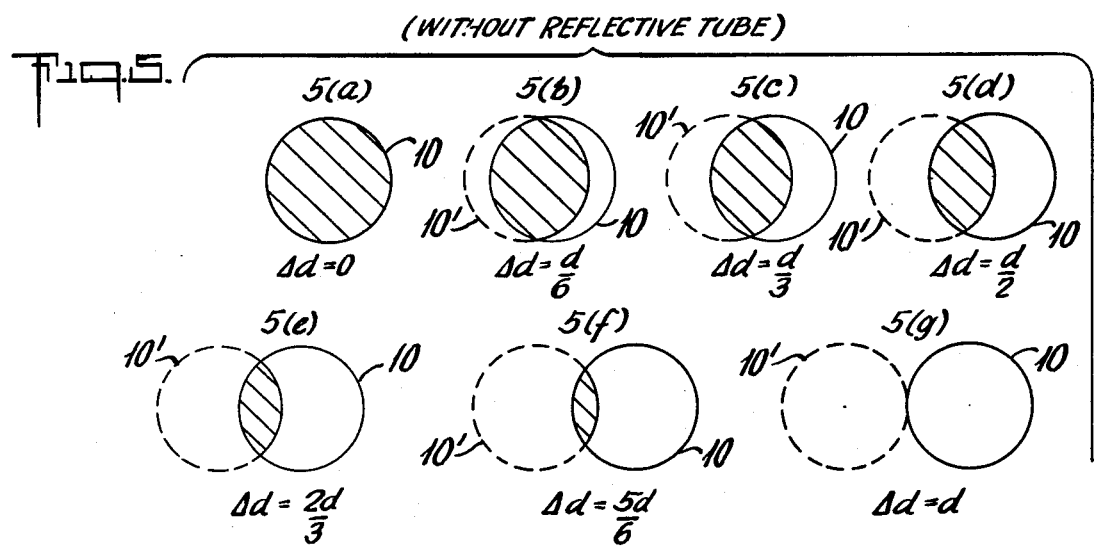
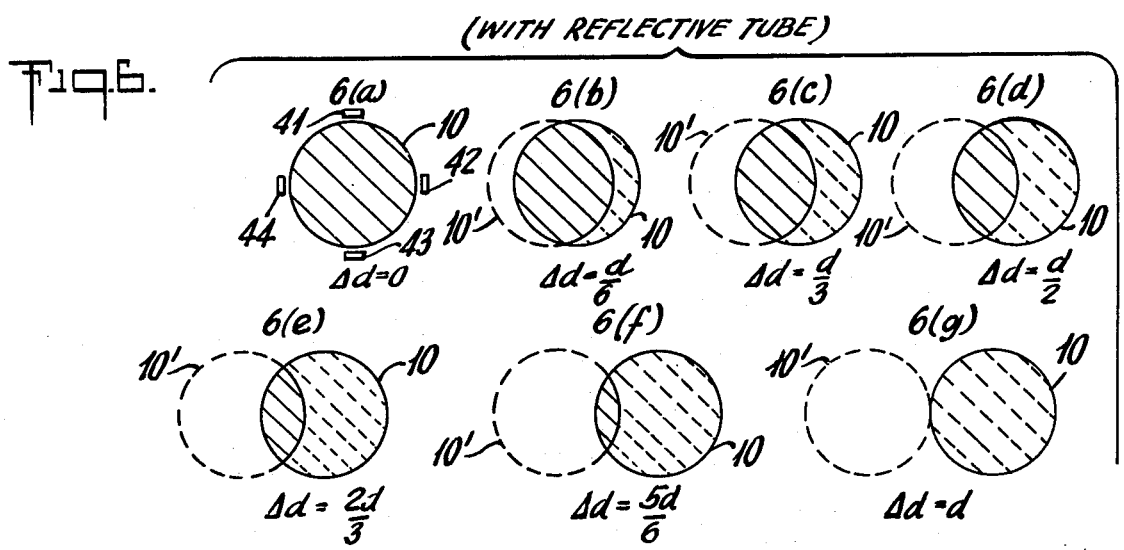

SOLAR-RADIATION COLLECTION APPARATUS

BACKGROUND OF THE INVENTION

The invention relates to solar-radiation collection apparatus of the self-tracking high- concentration variety, high-concentration being understood to apply to concentrations exceeding 100 suns, and especially in the range of 500 or more suns.

Our U.S. Pat. No. 4,086,485 discloses such a system involving multiple use of self-tracking collecting optical systems, each with its associated utilization device, such as a photovoltaic cell. The concentration of solar radiation is high and, for efficient utilization, the full image of the sun covers the exposure surface substantially only when the axis of the optical system is aligned with the sun. The angle subtended by observed diametral limits of the sun thus represents substantially the limit of optical-system axial misalignment which can be tolerated by the self-tracking mechanism. As a practical matter, the system is inherently self-tracking as long as a portion of the sun's image remains on the cell, since clock-operated diurnal-drive mechanism enables approximately correct optical-axis orientation for intervals in which the sun is not available, i.e., when the sun cannot be sensed for tracking or any other purpose. But for more prolonged intervals, for example days without sunshine, the inherently small off-axis angle of self-tracking capability can present a problem.

Further, the collecting optical system of said patent is of the Cassegrain variety, involving a centrally apertured primary mirror and a mounting of the cell to receive secondary-mirror reflected light via the aperture and at a location offset behind the primary mirror. And since the axis of the optical system must at all times be inclined, consistent with the sun's seasonal and diurnal elevation ranges, there is a substantial exposure of the cell to vertical convection currents of air, with attendant loss of thermal efficiency.

BRIEF SUMMARY OF THE INVENTION

It is an object of the invention to provide improved solar-radiation collection apparatus of the character indicated.

A specific object is to provide an inherently greater off-axis angle of self-tracking capability in apparatus of the character indicated.

Another specific object is to provide structure for substantially reducing thermal losses attributable to convection currents of air in such apparatus.

A general object is to achieve the foregoing objects with structure of elemental simplicity and low cost, lending itself to application in existing collecting-optical systems and compatible with existing self-tracking gear.

These and other objects and features are realized, in the context of the illustrative Cassegrain-type collecting-optical system here involved, by providing tubular shroud-like structure to locally surround a bundle of rays which converges to focus at the cell, following reflection by the secondary mirror. A mirror surface within the shroud enables capture (and redirection toward the cell) of thus-reflected convergent solar rays, for a substantially greater angle of misalignment with the sun than is otherwise achievable. If the shroud fully surrounds and supports the cell throughout its axial offset behind the primary mirror, a major rejection in convection-current loss is achieved. However, most complete convection-current loss is achieved if, as here to be described, the shroud extends through the primary-mirror aperture and projects therebeyond, to an axial extent short of interference with that radially innermost ray alignment between primary and secondary mirrors as will produce cell incidence for incoming light that is parallel to the axis of the optical system.

DETAILED DESCRIPTION

Preferred and other illustrative embodiments of the invention are described in conjunction with the accompanying drawings, in which:

FIG. 1 is a vertical sectional view through an optical system of the invention, for collecting and concentrating solar radiation, and with a fragmentary and schematic showing of associated suspension and self-tracking components;

FIG. 2 is a simplified fragmentary optical diagram, to illustrate an axially aligned condition of the axis of the optical system, with respect to the direction of the sun;

FIG. 3 is a view similar to FIG. 2, to illustrate an optical-axis misalignment $\alpha_s$ with respect to the direction of the sun;

FIG. 3A is a simplified diagrammatic representation to illustrate the localized nature of certain ray-vignetting within the optical system of FIG. 1, for the axis alignment $\alpha_s$;

FIG. 4 is a graph, comparatively depicting image incidence upon the cell, as a function of optical-axis misalignment $\alpha_s$, with and without use of the invention;

FIGS. 5(a) through 5(g) are simple diagrams to show image incidence at the cell, without use of the invention, for a succession of progressive misalignments of the optical axis;

FIGS. 6(a) through 6(g) are diagrams corresponding to FIGS. 5(a) through 5(g), but illustrating use of the invention;

FIG. 7 is a graph to illustrate properties of an element of FIG. 1; and

FIG. 8 is an enlarged view in perspective to illustrate modification of an element of FIG. 1. Referring initially to FIG. 1, the invention is shown in application to Cassegrain-type optical system for collecting solar radiation and for highly concentrating the same at focus upon the exposure surface of suitable utilization means 10, such as a photovoltaic cell. The optical system comprises a concave primary mirror 11 and a convex secondary mirror 12, rigidly positioned by struts 13 in axially spaced relation to the primary mirror 11, and directing secondary-mirror reflections to focus at the cell 10, via a central aperture in the primary mirror. A two- axis gimbal suspension for the optical system comprises a first gimbal frame 14 having freedom to tilt about a first gimbal axis A with respect to a fixed mounting (not shown), and a second gimbal frame 15 having freedom to tilt about a second gimbal axis B, orthogonal to axis A, the second frame 15 being mounted to the first frame 14 via tilt axis B, and the optical system being secured to the second frame 15 by bolts 16.

For self-tracking purposes, a single microprocessor 20, programmed with a maximization algorithm, serves each of the two coordinates of corrective displacement (about axis A and about axis B) of each of a plurality of collecting optical systems, of which the system 10-11-12 is but one; in this connection, reliance is upon time-multiplexing of solar-cell outputs and of control signals to tilt-axis drives for all collecting sytems, at suitably sequenced intervals. Reference is made to our U.S. Pat. No. 4,086,485 for more detailed description of such self-tracking operation, and it suffices here only to identify a simplified showing of components, namely: a sensing multiplexer 21 for sequentially sensing the cell outputs pertaining to the respective optical systems (specifically including the output of cell 10), the sequencing being governed via a control-line connection 22 to the microprocessor 20; and separate drive-control devices 23-24 to provide tilt-corrective drive of frames 14-15 about the respective axes A-B, based on the respective component-correction outputs 25-26 of the microprocessor 20, and with multiplexing at 27-28 to provide time-interlace with corresponding drive- control functions for the other optical systems served by the microprocessor. The indicated correctional drive mechanism for frames 14-15 about their gimbal axes A-B will be understood to be symbolized by the arrows for connections shown from devices 23-24 to the axis designations A-B in FIG. 1.

In accordance with the invention, a tubular shroud 30 is provided at the central aperture of the primary mirror 11. Preferably, shroud 30 extends as a single element for the axial distance L, from a lower location surrounding cell 10, through the primary-mirror aperture, and to an upper position axially beyond mirror 11. A peripheral flange 31 provides a convenient means for positioning or securing shroud 30 with respect to the backside of mirror 11 and, if desired, for also mounting the cell 10 in its rearwardly offset location behind the aperture region of mirror 11. The nature and function of shroud 30 will become clear, following an identification of geometrical and dimensional relationships, initially in connection with FIG. 2.

In FIG. 2, the secondary mirror 12 is seen to be of diameter D which exceeds the operative exposure-surface dimension d of cell 10, it being also understood for purposes of present discussion that the sun's image diameter has the same dimension d. For the sun-aligned condition depicted in FIG. 2, the secondary mirror 12 casts a circular masking shadow upon primary mirror 11, so that solar radiation collected by mirror 11 must all be developed from incident parallel rays including and external to internal limiting rays a—a. The dimensions D and d, the primary and secondary-mirror radii, and the relative axial positions of components 10-11-12, will also be understood to determine a primary-to-secondary ray b of first reflection attributable to each ray a, and an inner secondary-to-cell ray b' of second reflection attributable to each ray b, whereby ray b' impinges upon the remote transverse limit of the exposure surface of cell 10. In similar fashion, an outer ray c (reflected by the primary to the secondary mirror) will be understood to determine an outer secondary-to-cell ray c' of second reflection attributable to each ray c, whereby ray c' impinges upon the near transverse limit of the exposure surface of cell 10, it being noted that such limiting rays c' also establish a minimum value of the diameter H of the central aperture in mirror 11, and that the locus of all such rays c' is a geometrical cone of divergence angle $\alpha_1$.

Stated in other words, the locus of all primary- to-secondary rays b is a geometrical cone of convergence angle $\alpha_2$, and any primary-to-secondary ray attributable to parallel light from the sun and striking mirror 11 at a point radially inside of the incidence of ray a on mirror 11 would fail to be second-reflected to cell 10 and would therefore be useless. Thus, for the on-axis or sun-aligned condition of FIG. 2, an optically inutile annular geometrical solid 32 is defined by and between the conical loci of rays b-c', on the primary-mirror side of the intersection of these loci, and it is within this geometrical solid 32 that shroud 30 may be placed without interfering in any way with optimum cell response to the sun, when the optical-system axis is aligned with the sun. Stated in other words, if shroud 30 is of circular section at its upper end, then the shroud length L should be such that its upper end extends to an axial extent short of interference with that radially innermost ray alignment between the primary and secondary mirrors as will achieve cell incidence for incoming light which is parallel to the axis of the optical system.

For a tubular shroud 30 of circular section, it is preferred that the internal wall surface thereof be frustoconical and that the divergence angle thereof be the same $\alpha_1$, as previously noted for the convergent frustoconical locus of second-reflection rays c', with these two frusto-conical surfaces being substantially coincident. It is also preferred that a mirror finish be provided on the inner wall surface of shroud 30, to permit capture and reflection to cell 10 for rays that might otherwise fail to be reflected to impingement upon the exposure surface of cell 10. However, for the sun-aligned condition of FIG. 2, it will be clear that there are no such other rays to be thus captured or reflected into cell impingement.

FIG. 3 illustrates the utility and function of shroud 30, namely within off-axis misalignments to a materially greater degree than if shroud 30 were not employed. In particular, in FIG. 3, an off-axis misalignment $\alpha_s$ exists to the extent that, were it not for shroud 30 and for a locally interfering near- center region of the primary mirror 11, the focused image of the sun would appear as suggested by the dashed outline 10' of the cell (i.e., centered on the instantaneous axis S' of sun direction, and having the offset $\alpha_s$ from the optical-system axis S); dashed outline 10' is eccentrically offset from the solid-line showing of cell 10, the outlines 10-10' being shown for the case of their mere tangency. The tangent relation will mean that, without shroud 30, no part of the sun's image (at offset misalignment $\alpha_s$, corresponding to the cell dimension d) will impinge upon cell 10. However, using shroud 30 and its reflecting inner wall, the instantaneous axis S' and its surrounding bundle of second-reflection rays from the sun will be reflected by the inner wall of shroud 30, so that a substantial cell response will be achieved; FIG. 3 also shows, for the case of an inner ray a, with first-reflection and second-reflection ray alignments b-b', respectively, there is further capture by shroud 30, with ultimate reflected guidance to cell impingement.

FIG. 3A illustrates that for the off-axis misalignment situation of FIG. 3, the shroud 30 becomes a mask for some first-reflection rays that might otherwise be the source of second reflection, to otherwise possible capture within shroud 30. The offset P in FIGS. 3 and 3A expresses the maximum extent of offset for which such masking applies, accounting for at least a crescent (see FIG. 3A) of sectional area which is thus precluded from cell response; however, it will be appreciated that the fractional loss attributable to the crescent of FIG. 3A is of no moment, since cell 30 only requires some (i.e., not optimum) ray incidence for self-tracking purposes, and a full-response to cell 10 automaticaly develops from self-tracking action, to correct from misalignment (FIG. 3) to full alignment (FIG. 2) with the sun.

FIG. 4 graphically illustrates the at least two-fold increase in tolerable off-axis misalignment $\alpha_s$ achievable through use of shroud 30 in the described optical system, as compared to omission of the shroud. And in FIGS. 5 and 6, simplified diagrams progressively account for such difference. In particular, the diagrams of FIG. 5 depict the no-shroud situation, beginning at FIG. 5(a) for the sun-aligned condition, and ending at FIG. 5(g) with the tangent condition above-described at 10-10' in connection with FIG. 3. Progressive offsets $\Delta$ d are considered at six equal increments, from 0 (FIG. 5(a)) to d (FIG. 5(g)), i.e., to the point of loss of cell response to the sun, with shading to depict the extent to which the sun's rays impinge upon cell 10. Similarly, the diagrams of FIG. 6 depict the situation when shroud 30 is used, beginning at FIG. 6(a) with the sun-aligned condition, and ending at FIG. 6(g) with offset-axis condition $\Delta$ d=d. Progressive offsets $\Delta$ d are considered at the same six equal increments in FIG. 6 as in FIG. 5, but dahsed shading is adopted as an indication of the fact that shroud reflection adds to the light flux incident at the cell; it will be understood that the showings of FIG. 6 are purely schematic, in that light flux incident at the cell will not necessarily be uniformly distributed over the cell for the angular misalignments depicted, but rather that there will be important contributions to such incidence for all $\Delta$ d misalignments depicted. Thus, in the assumed condition of a reflecting shroud of length L (i.e., to the upper limit of the geometrical solid 32), at least a two- fold increase is achieved for the range of off-axis misalignment within which cell response can be relied upon to enable self-tracking functions.

FIG. 6(a) additionally schematically shows, at 41-42-43-44, four like quadrature cell elements carried at equal angular offset around the cell 10, being part of an alternative means for sensing and correcting misalignment of the optical-system axis with respect to the sun; such a tracking system operates from detected polarized differences in response between opposite pairs of cells 71-73 and 72-74, and is more fully described as an alternative, in U.S. Pat. No. 4,086,485. However, in the event of employing such an alternative in the case of an optical system which includes shroud 30, it will be appreciated that certain angles of second-reflection ray incidence upon the inner wall of shroud 30 can cause misleading incidence upon one or both of the cells of either of the pairs 71-73, 72-74, with at least an impaired ability to automatically correct the axis orientation. To offset this difficulty, FIG. 7 graphically indicates the provision of progressively varying reflectivity as a function of axial location along the inner wall of shroud 30. Thus, in the solid line of FIG. 7, a non-linear function characterizes varying reflectivity of this inner wall, from a maximum at and near cell 10 to a minimum at and near the upper end, at axial distance L from cell 10; alternatively, the dotted line of FIG. 7 indicates another varying-reflectivity characteristic, it being understood that a different such characteristic may be indicated, unique for the particular dimensions and proportions of any given collecting optical-system (with shroud 30) configuration.

FIG. 8 is a perspective view of a tubular shroud 30' representing an alternative of the circular-section shroud 30 thus far discussed, shroud 30' having a square or rectangular section, at any given point along its central axis. Thus, shroud 30' provides a first pair of opposed flat sides 45-46 and a second pair of opposed flat sides 47-48; and a cell 50 with a square or rectangular exposure face is supported at the lower end of shroud 30', while a mounting flange 51 surrounds the shroud for locating reference or mounting to the backside of primary mirror 11. The inner surface of shroud 30', i.e., each of the opposed facing surfaces of each pair 45-46 and 47-48, is of reflecting character, and each pair is opposed in the directional sense of one of the orthogonal gimbal axes A-B, as suggested by legend in the drawing. Thus, corrective input radiation for B-axis tilt correction is derived by cell 50 with the aid of reflecting surfaces of sides 45-46; and corrective input radiation for A-axis tilt correction is derived by cell 50 with the aid of reflecting surfaces of sides 47-48. Finally, it is observed that for maximum upward extent of each of the sides 45-46-47-48, the above-stated criterion to avoid interference with the radially innermost first-reflection ray alignment (i.e., between the primary and secondary mirrors 11-12) dictates elliptically arcuate upper edges, as shown, and this is true whether shroud 30' is of constant section or if, as in preferred, the opposed sides of each pair diverge in accordance with principles discussed above the for frusto-conical embodiment.

The described embodiments of the invention will be seen to have achieved all stated objects. By the simple modification of adding a shroud between the cell 10 and the primary-mirror aperture, there is an immediate protection of the exposure surface of the cell from the convection currents of all air which would otherwise be free to circulate across the highly concentrated heat region in which it is necessarily immersed. And the provision of a mirror surface between the primary mirror and the cell, and/or in the region thereabove to the point of avoiding interference with first-reflection on-target rays provides a substantial widening of the capability of the tracking mechanism to reacquire sun alignment, even following a prolonged absence of available sunlight.

While the invention has been described in detail for the forms shown, it will be understood that modifications may be made without departure from the claimed scope of the invention. For example, the decision whether to employ a shroud 30 of circular section, or of frusto-conical or cylindrical shape, or of square section (whether or not flared), or only within the space between cell 10 and primary mirror 11, or only upward beyond the primary mirror, or with a particularly characterized reflectivity characteristic as a function of axial location—will all depend upon the geometry of the optical system and associated cell 10, upon local geographical and meteorological consideration, and upon the nature of the self-tracking instrumentalities employed, it being desired that for use of a maximization algorithm at microprocessor 20, the overall response of the cell 10 to sun exposure should always be maximum when the sun is in on-target alignment, and that such response should drop (not necessarily uniformly) as a function of increasing off-axis misalignment $\alpha_s$.

What is claimed is:

1. In solar-radiation collection apparatus, wherein frame structure includes a gimbal-suspension for a radiation-collection optical system and an associated radiation-responsive cell, and wherein the optical system comprises a primary concave mirror with a central aperture and a secondary convex mirror, with the optical focal point behind the aperture and with the cell positioned at the focal point, the improvement wherein a tubular shroud surrounds the cell and the space between the cell and the aperture region of the primary mirror.

2. The improvement of claim 1, in which the tubular shroud has a reflecting inner surface.

3. The improvement of claim 1, in which the tubular shroud extends through the primary-mirror aperture to an axial extent short of interference with that radially innermost ray alignment between primary and secondary mirrors as will achieve cell incidence for incoming light which is parallel to the axis of the optical system.

4. The improvement of claim 3, in which the tubular shroud has a reflecting inner surface.

5. The improvement of claim 4, in which reflectivity of said inner surface is a function of axial distance from the focal point.

6. The improvement of claim 5, in which said function is such that reflectivity decreases with increasing distance from the focal point.

7. The improvement of claim 1, in which the cell has a sensitive exposure surface sized to accept all of the circular image of the sun substantially only when the optical-system axis is aligned with the sun, said tubular shroud having a reflecting inner-surface wall formation which diverges from the optical axis as a function of axial offset from the cell.

8. The improvement of claim 7, in which the reflecting surface of said shroud is frusto-conical and diverges outwardly.

9. The improvement of claim 7, in which the reflecting wall formation of said shroud includes a pair of opposed plane surface which face each other across the bundle of solar rays incident on the cell when the optical-system axis is aligned with the sun.

10. The improvement of claim 9, in which the reflecting wall formation of said shroud includes a further pair of opposed plane surfaces which face each other from locations intermediate those of said first-mentioned pair.

11. The improvement of claim 1, in which said shroud is secured to and carried by the backside of the primary mirror.

12. The improvement of claim 11, in which said shroud extends through the primary-mirror aperture.

13. In solar-radiation collection apparatus, wherein frame structure includes a gimbal-suspension for a radiation-collection optical system and an associated radiation-responsive cell, and wherein the optical system comprises a primary concave mirror with a central aperture and secondary convex mirror with the cell positioned at the focal point and receiving concentrated incoming rays near and via the aperture, the improvement in which a tubular shroud with a reflecting inner surface is carried by the primary mirror at the aperture region thereof and surrounds the bundle of solar rays incident on the cell when the optical-system axis is aligned with the sun, said shroud extending in the direction of the secondary mirror to an extent short of interference with that radially innermost ray alignment between primary and secondary mirrors as will achieve cell incidence for incoming light which is parallel to the axis of the optical system.

14. The improvement of claim 13, in which said shroud is frusto-conical and is divergent in the direction of increasing axial offset from the primary mirror.

15. The improvement of claim 14, in which the frusto-conical divergence angle is substantially the angle of convergence defined by and between the outermost rays of secondary-mirror-reflected light which will achieve cell incidence for incoming light which is parallel to the axis of the optical system.

16. In solar-radiation collection apparatus, wherein frame structure includes a gimbal-suspension for a radiation-collection optical system and an associated radiation-responsive cell, and wherein the optical system comprises a primary concave mirror with a central aperture and a secondary convex mirror with the cell positioned at the focal point and receiving concentrated incoming rays near and via the aperture, the improvement in which a pair of mirror elements is carried by the primary mirror in diametrically opposed face-to-face relation at the aperture region, said mirror elements being sufficiently spaced to span the bundle of solar rays incident on the cell when the optical-system axis is aligned with the sun, said mirror elements extending in the direction of the secondary mirror to an extent short of interference with that radially innermost ray alignment between primary and secondary mirrors as will achieve cell incidence for incoming light which is parallel to the axis of the optical system.

17. The improvement of claim 16, in which said mirror elements have flat reflecting surfaces.

18. The improvement of claim 16, in which said mirror elements diverge in the direction of increasing axial offset from the primary mirror.

19. The improvement of claim 17, in which said mirror elements are substantially tangent to the geometrical surface defined by and between the outermost rays of secondary-mirror-reflected light which will achieve cell incidence for incoming light which is parallel to the axis of the optical system.

20. The improvement of claim 16, in which the exposure surface of the cell is rectangular and in which said mirror elements are opposed to each other in a direction parallel to one of the rectilineal dimensions of the rectangular configuration of the exposure surface of the cell.

21. The improvment of claim 20, in which the gimbal-suspension system includes a gimbal axis which is orthogonal to said one rectilineal dimension of the cell.

22. The improvement of claim 16, in which said mirror elements are inner-surface regions of a tubular shroud surrounding the bundle of solar rays incident on the cell when the optical-system axis is aligned with the sun.

23. The improvement of claim 22, in which the inner surface of the shroud includes a further pair of mirror elements in diametrically opposed face-to-face relation.

24. The improvement of claim 23, in which the exposure surface of the cell is rectangular and in which said pairs of opposed mirror elements are opposed in orthogonally related directions which are parallel to the respective rectilineal dimensions of the rectangular configuration of the exposure surface of the cell.

25. The improvement of claim 24, in which the gimbal-suspension system comprises two orthogonally related gimbal axes, said gimbal axes being parallel to the respective rectilineal dimensions of said rectangular configuration.

* * * * *